(12) United States Patent  (10) Patent No.: US 9,002,965 B1
Muthukrishnan et al.  (45) Date of Patent: Apr. 7, 2015

(54) DISTRIBUTION OF MESSAGES IN NODES CONNECTED BY A GRID ARCHITECTURE

(71) Applicant: EMC Corporation, Hopkinton, MA (US)

(72) Inventors: Vivekanandan Muthukrishnan, Villupuram (IN); Afzal Rahman Jan, Bangalore (IN); Prakash Achuthan, Bangalore (IN); Kavitha Papanna, Bangarpet (IN); Mahesh Kamath, Karkala (IN); Roshan Krishnan, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/947,272

(22) Filed: Jul. 22, 2013

Related U.S. Application Data

(63) Continuation of application No. 12/637,063, filed on Dec. 14, 2009, now Pat. No. 8,495,153.

(51) Int. Cl.
   *G06F 15/16* (2006.01)
   *G06F 9/54* (2006.01)

(52) U.S. Cl.
   CPC ...................................... *G06F 9/546* (2013.01)

(58) Field of Classification Search
   USPC .................................................. 709/200, 206
   See application file for complete search history.

(56) References Cited

U.S. PATENT DOCUMENTS

| | | | | |
|---|---|---|---|---|
| 5,675,733 A | * | 10/1997 | Williams | 709/206 |
| 6,148,329 A | * | 11/2000 | Meyer | 709/206 |
| 6,425,002 B1 | * | 7/2002 | Zurcher et al. | 709/223 |
| 6,728,714 B1 | * | 4/2004 | Doganata et al. | 1/1 |
| 7,200,657 B2 | * | 4/2007 | Adams et al. | 709/224 |
| 7,584,274 B2 | * | 9/2009 | Bond et al. | 709/223 |
| 8,010,633 B2 | * | 8/2011 | Van Datta et al. | 709/220 |
| 8,166,118 B1 | * | 4/2012 | Borghetti | 709/206 |
| 8,291,029 B2 | * | 10/2012 | Asthana et al. | 709/206 |
| 8,396,984 B2 | * | 3/2013 | Van Datta et al. | 709/238 |
| 2002/0091772 A1 | * | 7/2002 | Yong | 709/206 |
| 2004/0139148 A1 | * | 7/2004 | Norton et al. | 709/200 |
| 2005/0144242 A1 | * | 6/2005 | Marston et al. | 709/206 |
| 2006/0031316 A1 | * | 2/2006 | Forstadius | 709/206 |
| 2006/0149836 A1 | * | 7/2006 | Robertson et al. | 709/224 |
| 2006/0206621 A1 | * | 9/2006 | Toebes et al. | 709/238 |
| 2006/0288080 A1 | * | 12/2006 | Orszag et al. | 709/217 |
| 2007/0078935 A1 | * | 4/2007 | Garcia-Martin et al. | 709/206 |
| 2007/0118602 A1 | * | 5/2007 | Heinla et al. | 709/206 |
| 2007/0282899 A1 | * | 12/2007 | Goodman et al. | 707/103 X |
| 2007/0300297 A1 | * | 12/2007 | Dawson et al. | 726/22 |
| 2009/0013047 A1 | * | 1/2009 | Adreon et al. | 709/206 |
| 2009/0151006 A1 | * | 6/2009 | Saeki et al. | 726/28 |
| 2009/0228892 A1 | * | 9/2009 | Di Luoffo et al. | 718/104 |

(Continued)

*Primary Examiner* — Anthony Mejia

(74) *Attorney, Agent, or Firm* — Krishnendu Gupta; Joseph D'Angelo

(57) ABSTRACT

A method, system, and a computer program product for transferring a message from a source node to recipient nodes connected by a grid architecture. According to an aspect, a source node stores a message in a message grid. An identifier and a message-type of the message are then received in a message manager node. If the type of message to be sent to the recipient nodes is the same as the message-type of the message stored in the message grid, the message manager node sends the identifier to the recipient nodes. The recipient nodes then retrieve the message from the message grid using the message identifier. Recipient nodes register with a registration grid specifying the type of message desired to be received.

20 Claims, 6 Drawing Sheets

(56) References Cited

U.S. PATENT DOCUMENTS

| | | | |
|---|---|---|---|
| 2010/0185741 A1* | 7/2010 | Lee et al. | 709/206 |
| 2010/0332454 A1* | 12/2010 | Prahlad et al. | 707/654 |
| 2011/0106905 A1* | 5/2011 | Frey et al. | 709/212 |
| 2011/0196933 A1* | 8/2011 | Jackson et al. | 709/206 |
| 2013/0325967 A1* | 12/2013 | Parks et al. | 709/204 |
| 2014/0089435 A1* | 3/2014 | Jackson et al. | 709/206 |

* cited by examiner

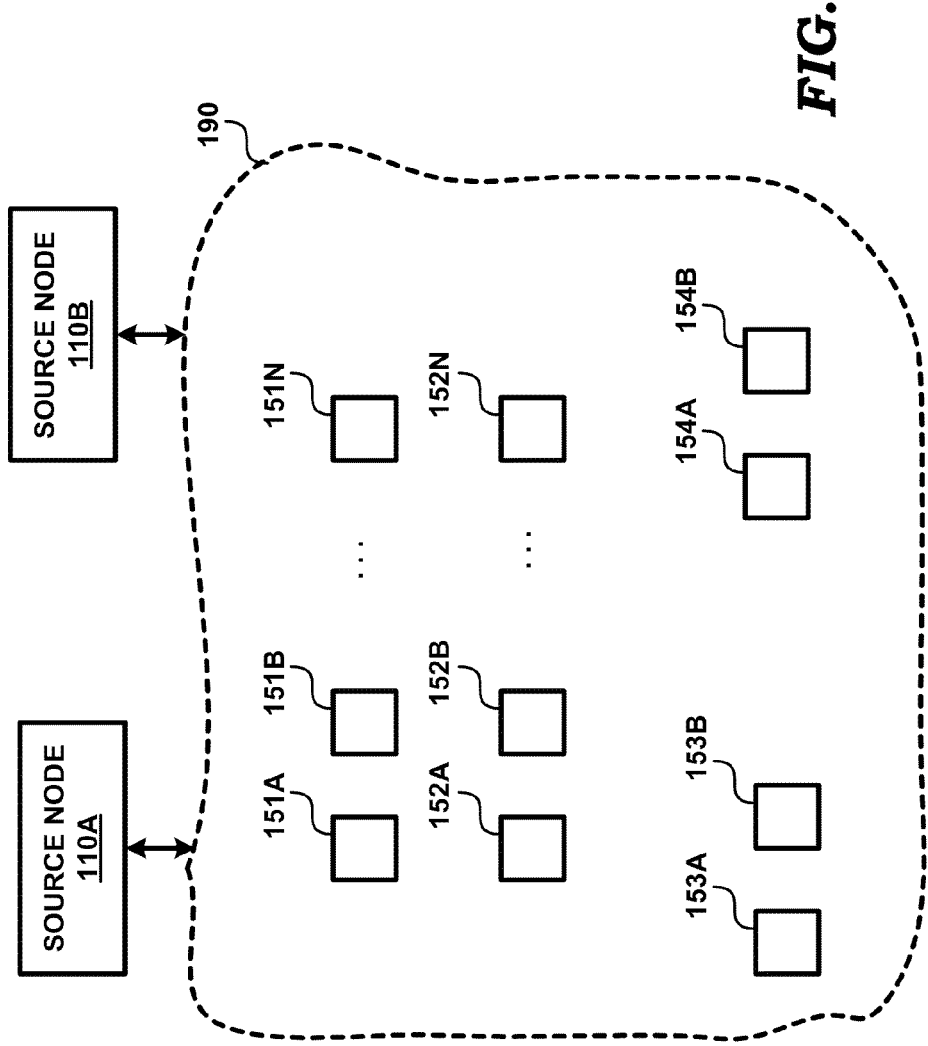

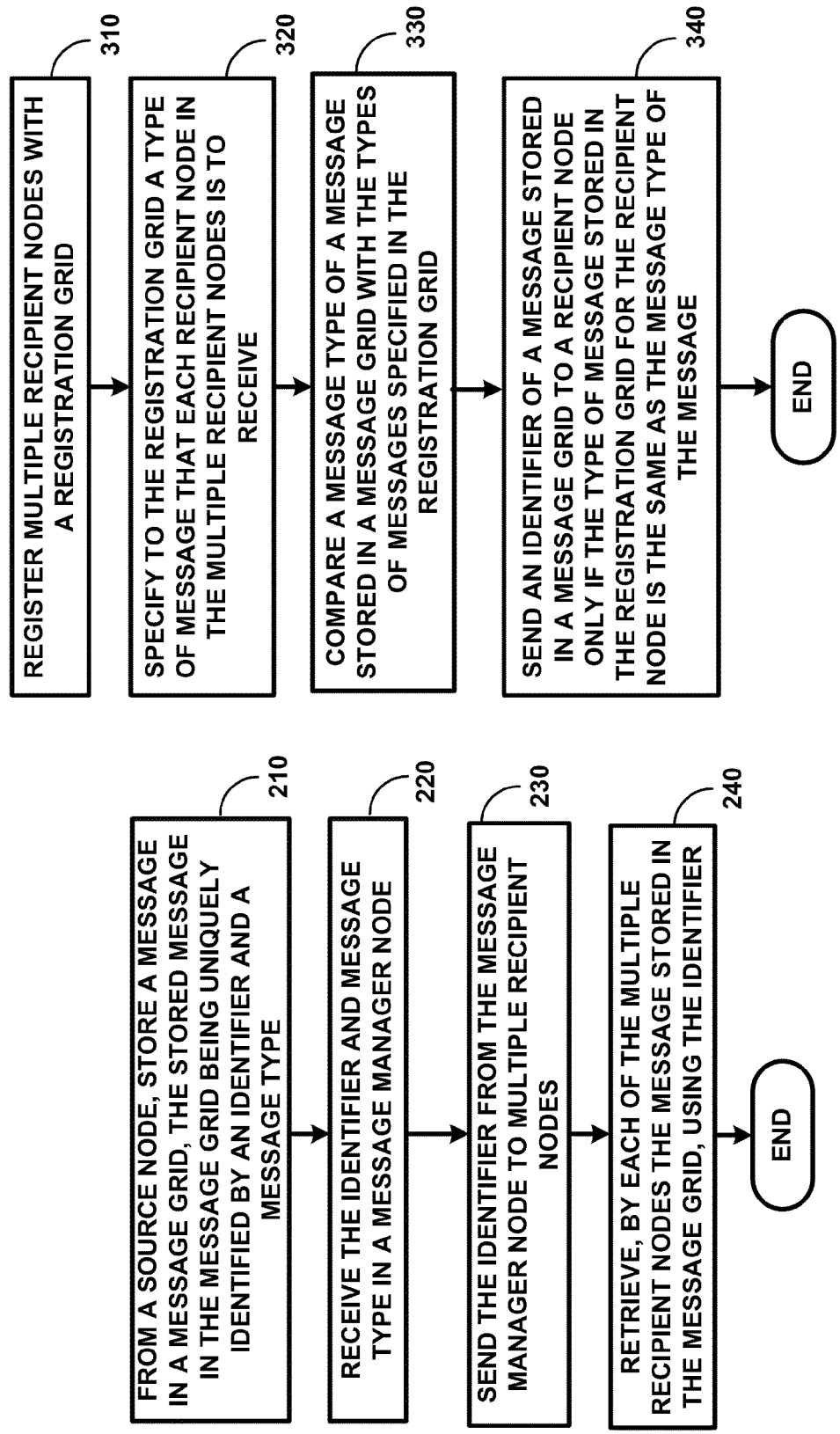

DISTRIBUTION OF MESSAGES IN NODES CONNECTED BY A GRID ARCHITECTURE

RELATED APPLICATIONS AND PRIORITY CLAIM

This application is a Continuation of U.S. patent application Ser. No. 12/637,063 entitled "DISTRIBUTION OF MESSAGES IN NODES CONNECTED BY A GRID ARCHITECTURE" filed on Dec. 14, 2009, the contents and teachings of which are incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to data grids, and more specifically to methods, systems, and a computer program product for distribution of messages in nodes connected by a grid architecture.

BACKGROUND

Distribution of messages (e.g., events, alerts, etc.) from a source node to a recipient node (or nodes) has often been performed using a point-to-point approach. According to such an approach, a source node (termed a publisher) may transmit the message to each of the recipient nodes (termed listeners) through a network of nodes, for example, using socket or RPC (Remote Procedure Call) mechanisms. The publisher may, in addition, also store the message in a message repository. The point-to-point approach may have a drawback, in that the message, which may often be large in size, may need to be replicated and sent to each of the recipient nodes, thereby causing a relatively heavier load on the network. Other drawbacks may include a smaller number of messages that can be transferred in unit time, message filtering policies having to be custom-defined in each of the recipient nodes, recipients having to first register with the publisher, etc.

SUMMARY

An aspect of the present invention advantageously uses data grid features in transferring a message from a source node to recipient nodes. A source node (also termed publisher) stores a message in a message grid organized as a data grid. A message manager receives from the message grid an identifier of the stored message, and sends the identifier to the recipient nodes. The recipient nodes may subsequently retrieve the message from the message grid using the identifier.

BRIEF DESCRIPTION OF DRAWINGS

The above and further advantages of the present invention may be better under stood by referring to the following description taken into conjunction with the accompanying drawings in which:

FIG. 1 shows an example environment in which several aspects of the present invention are implemented in one embodiment;

FIG. 2 shows an overview of an embodiment for notifying recipient nodes of a message generated by a source node of FIG. 1;

FIG. 3 shows an overview of an embodiment for registration of recipient nodes of FIG. 1 with a registration grid;

DETAILED DESCRIPTION

Figure 4:
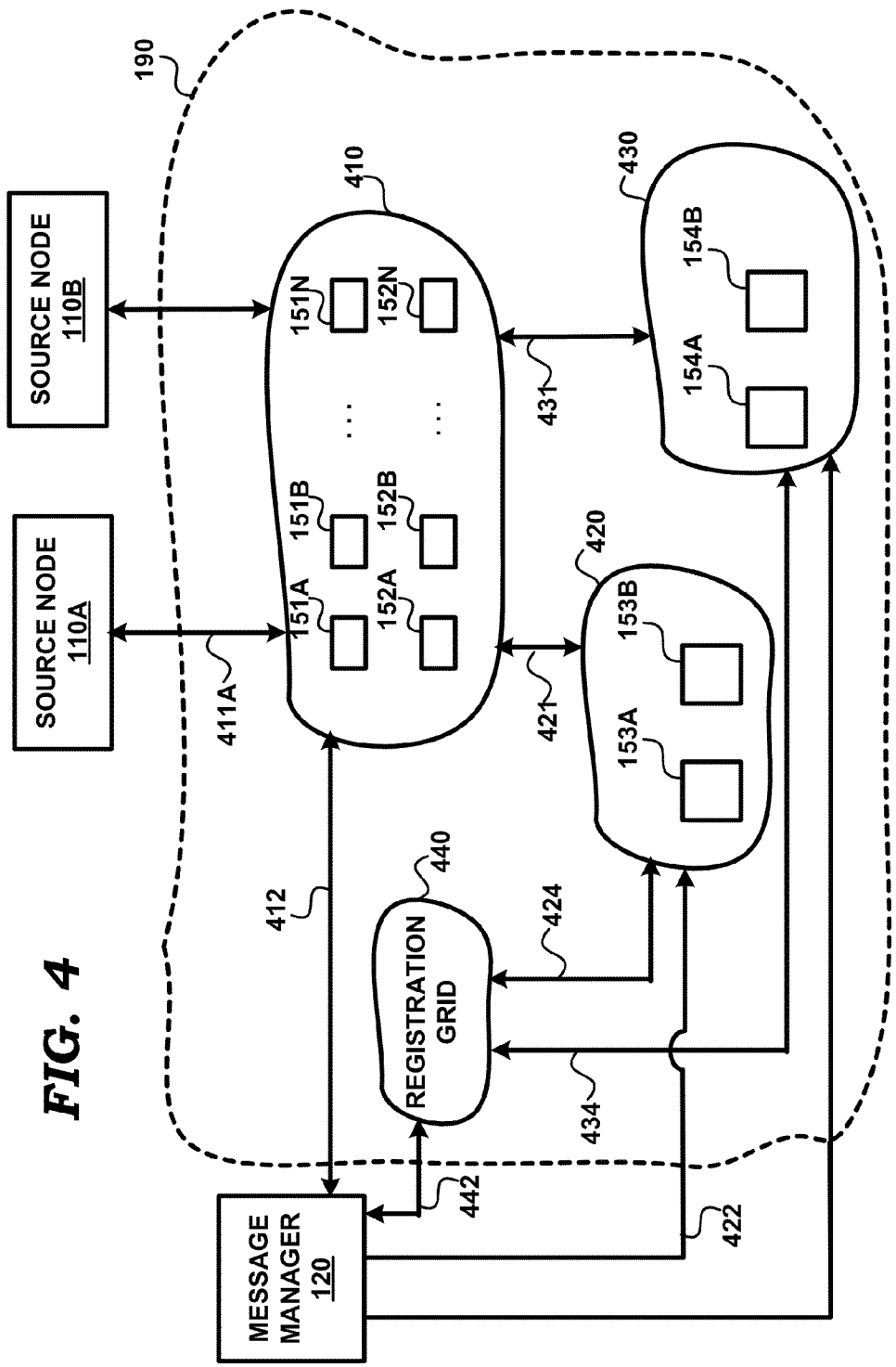
FIG. 4 shows a diagram used to illustrate transactions between the various nodes of FIG. 1 in distributing a message, in an embodiment.

Current approaches to message distribution do not leverage existing data grid architectures to distribute messages from a source to multiple recipients, and typically employ point-to-point transfer approaches. The techniques described herein take advantage of existing data grids in a network to distribute data.

In an embodiment, a source node stores a message in a message grid, and sends only an identifier of the message in the message grid to recipient nodes via a data distribution channel. The message grid handles the forwarding of the message to corresponding nodes in the grid that are closer to recipient nodes. Each of the recipient nodes then retrieves the message from the message grid using the identifier. Thus, the data co-location policies of the message data grid are leveraged to transparently move the message closer to the recipient nodes.

The data distribution channel/grid, having to distribute only the comparatively smaller-sized identifier of the message (rather than the message itself), enables quick message notification. Message filtering policies are implemented in a registration grid, outside of the recipient nodes, obviating the need for filtering policies to be implemented in the recipient nodes.

Reference is now made in detail to exemplary embodiments of the invention, examples of which are illustrated in the accompanying drawings.

FIG. 1 shows an example environment in which several aspects of the present invention are implemented, in an embodiment. The environment is shown containing a 'super' grid 190 of computing nodes 151A-151N, 152A-152N, 153A, 153B, 154A and 154B, and source nodes 110A and 110B. The nodes shown contained within super grid 190 can communicate with each other over a network (not shown), and may be configured or organized to form one or more (smaller) data grids. The nodes of FIG. 1, may be viewed as being connected by a "grid architecture".

As is well-known in the relevant arts, a data grid is generally a network of interconnected computing nodes in which data is stored in a distributed fashion. A data grid may contain associated operating systems and/or programs (generally termed data grid solutions) to enable sharing and management of the stored data that allows (among other benefits) moving data from one node in the data grid to another node in the data grid, for example, to make the data available in a node located closer to a recipient (consumer) node requiring the data. In other words, data co-location policies of a data grid move the stored data closer to a recipient node executing application(s) that require the data. An example of a data grid management solution is COHERENCE™ from Oracle Corporation, which supports distributed data storage (data persistence), provides for configurable data co-location policies, handles distributing of data across the data grid, etc.

As an example, nodes 151A-151N and nodes 152A-152N of FIG. 1 may be organized to form a data grid. The terms 'organized as a data grid', 'forming a data grid' etc., are synonymously used to mean that the nodes are deployed with data grid solutions to provide corresponding data grid features, as noted above. Therefore, data stored in any one of the nodes 151A-151N and 152A-152N can be moved (by operation of the associated data grid management solution) to any other node in the set of nodes 151A-151N and nodes 152A-152N. Thus, data stored in node 151N can be moved (by operation of the data grid management application) to, for example, node 152A, which may be located in closer proximity (in terms of the data communication path length) to node 153A. Node 153A may thus retrieve from node 152A data that was earlier in node 151N. The movement of data from node 151N to node 152A is thus performed without intervention of node 153A.

Source nodes 110A and 110B may need to send messages to corresponding recipient nodes. Examples of a message include data required by applications in a recipient node, an event, an alert, etc.

FIG. 2 shows an overview of an embodiment for notifying recipient nodes of a message generated by a source node of FIG. 1. However, in alternative embodiments, some of the steps may be performed in a different sequence than that depicted below, as suited to the specific environment, as will be apparent to one skilled in the relevant arts.

In step 210, a source node stores a message in a message grid. The stored message in the message grid is uniquely identified by an identifier and a 'message-type'. In an embodiment, the message grid is deployed with components or modules which generate the identifier and message type. Some examples of message type include "Performance Warning Event", "Failure Alert", and "Generic SNMP Trap".

In step 220, a message manager node receives the identifier and the 'message-type' of the stored message from the message grid. In an embodiment, the components or modules (noted above) which generate the identifier and the message type send the identifier and the message type to the message manager node.

In step 230, the message manager node sends the identifier to multiple recipient nodes. The message manager node may determine the identities of the recipient nodes as described with respect to FIG. 3.

In step 240, each of the multiple recipient nodes retrieves the message stored in the message grid, using the identifier. The message grid, having a data grid architecture, makes the stored message available in nodes (within the message grid) located proximally to each of the respective recipient nodes. Each of the multiple recipient nodes may retrieve the message from the message grid conveniently at later points in time (from the time the identifier is received in the recipient nodes). In an embodiment, a recipient node retrieves the message when an application executing in the recipient node requires the message for further operation.

The technique of sending only the message identifier rather than the message itself enables notification of the message to the recipient nodes much faster than if the source node were to send the message to the recipients, for example, as in a point-to-point type of approach. Further, the storage of the message in the message grid leverages the capabilities of the grid itself in (at least partially) moving the data closer to a recipient node. The source node, therefore, does not need to determine a route (for transferring the message) to a recipient node.

In an embodiment, recipient nodes themselves form a data grid, termed a data distribution channel. Different (recipient) data grids may be formed based on the type of message that the recipients wish to receive. Prior to forming respective data grids, the recipients register with a registration grid. FIG. 3 shows an overview of an embodiment for registration of recipient nodes of FIG. 1 with a registration grid.

In step 310, multiple recipient nodes register with a registration grid. The registration process may include specifying the address of the recipient node.

In step 320, each of the multiple recipient nodes specifies (to the registration grid) a corresponding type of message that the recipient node wishes or needs to receive. In general, the type of message desired to be received depends on the functionality provided by a recipient node based, for example, on the nature of the applications executing in the recipient node. The registration node may maintain a table containing entries specifying recipient-node-addresses and the type of message each recipient node wishes to receive. The specification of the types of messages a node wishes to receive may be viewed as setting message-filtering policies at the registration grid, and can be performed dynamically, i.e., a recipient node can update or change the type(s) of messages it wishes to receive dynamically.

In step 330, a message-type of a message stored in a message grid is compared with the types of messages specified (by corresponding recipient nodes) in the registration grid. The comparison may be performed by a message manager node, which having received the identifier and message-type of a message stored in a registration grid (as in step 220 of FIG. 2) needs to determine which recipient nodes to send the identifier to.

In step 340, an identifier of a message stored in a message grid is sent to a recipient node only if the type of message stored in the registration grid for the recipient node is the same as the message-type of the message.

Recipient nodes specifying (in the registration grid) a same message-type that is desired to be received form a corresponding data grid, termed a data distribution channel. Thus, several data distribution channels may be formed, as recipient nodes register with the registration grid.

The identifier of a message, once sent from the message manager to a data distribution channel, is maintained (stored) in the data distribution channel until such time as a corresponding recipient node erases/removes the identifier, i.e., the identifier 'persists' in the data distribution channel till erased by a recipient node. Assuming a recipient node becomes non-operational (due to some failure) prior to receipt of a message identifier in the corresponding data distribution channel, the recipient node upon becoming operational again, can read the message identifier(s), enabling it, thereby, to retrieve the corresponding message(s) from the message grid.

Further, since the message manager sends only a smaller sized message identifier (rather than the message itself) through a data distribution channel to a corresponding recipient node, the load on the data distribution channel in transferring the identifier is small, and the transfer of the identifier itself is accomplished in a relatively short time duration. The overview of the embodiments provided above with respect to FIG. 2 and FIG. 3 are illustrated in FIG. 4, which also illustrates transactions between the various nodes of FIG. 1 in distributing a message, in an embodiment.

In FIG. 4, nodes 151A-151N and 152A-152N represent a message grid 410, in which source nodes (e.g., 110A and 110B) store messages. Recipient nodes are represented by 153A, 153B, 154A and 154B. In the example of FIG. 4, it is assumed that messages stored by source nodes 110A and 110B in message grid 410 may be one of only two types. Further, it is assumed that recipient nodes 153A and 153B register (via path 424) with registration grid 440, each specifying same message-type to be received.

Similarly, recipient nodes 154A and 154B register (via path 434) with registration grid 440, each again specifying a same message-type to be received, but different from the one specified by recipient nodes 153A and 153B. Recipient nodes 153A and 153B form a data grid 420. Recipient nodes 154A and 154B form another data grid 430. Data grids 420 and 430 represent data distribution channels, as noted above. Message grid 410, grid 420, grid 430 and registration grid 440, each of which is a data grid, together form 'super' grid 190 (shown in dotted line). Each of the recipient nodes may contain one or more applications or virtual machines (VM) executing in them. The components and blocks of FIG. 4 are shown merely by way of illustration, and real-world systems may contain more or fewer components, both in type and in number, than those shown in FIG. 4.

In operation, assuming source node 110A stores (via path 411A) a message in message grid 410, message manager 120 receives, on path 412, the identifier of the stored message as well as the message-type from message grid 410. Message manager 120 communicates via path 442 with registration grid 440 to determine which recipient nodes are to be notified with the identifier of the message.

Assuming, message manager 120 determines that the message-type stored in message grid 410 corresponds (or is the same) as the type specified in registration grid 440 by recipient nodes 153A and 153B, message manager 120 sends the identifier of the message to grid 420. Each of the recipient nodes 153A and 153B in grid 420 receives the identifier via path 422, and may each retrieve the message (via path 421) at a desired point in time from message grid 410. As noted above, the specific time at which each of recipient nodes 153A and 153B retrieves the message may be based on when applications executing in them require the message.

Data distribution from a source node to recipient nodes 154A and 154B forming grid 430 may be performed in a manner similar to that described above.

Another aspect of the present invention addresses potential loss of message delivery to a recipient node (or an application executing in it), even if the node (or the application) is non-operational (due to failure conditions) at the time the message manager sends notification of a message in the form of a message identifier. Since a data distribution channel stores (persists) an identifier in the channel till the identifier is distributed to, or received by, all recipient nodes in the channel, the (previously failed) recipient node upon becoming operational again, can read the message identifier, and retrieve the corresponding message from the message grid. The persistence of the identifier in the data distribution channel may inherently be performed by the data distribution channel, or can be implemented by specific components or modules which enable such a feature.

The duration for which an identifier is maintained in a data distribution channel can also be controlled based on time-based expiry policies set for the distribution channel. Thus, for example, an identifier sent by the message manager node to a data distribution channel may be stored in the distribution channel for a period of twenty four hours (as set by expiry policy), after which the channel (or corresponding components in the channel) may automatically delete the identifier. If such a policy is set, then a failed node may (in the worst case) be able to obtain the stored message identifier only if the duration of failure is less than the expiry time (e.g., twenty four hours) of the identifier.

Figure 5:
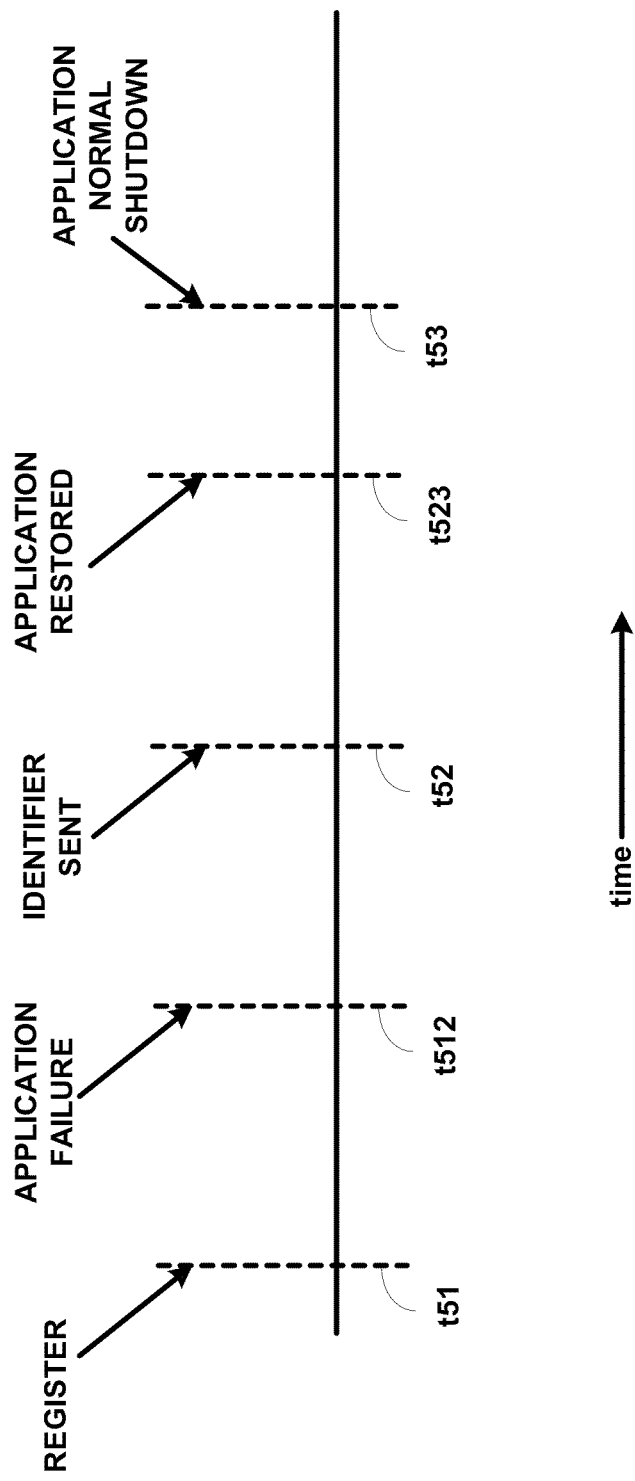
FIG. 5 shows a timing diagram illustrating message retrieval in the event of failure in a recipient node of FIG. 4.

FIG. 5 shows a timing diagram illustrating message retrieval in the event of failure in a recipient node shown in FIG. 4. A recipient node, e.g., 153A, (or an application executing in it) registers with a registration grid at time instance t51. Assuming no failure (normal operation), recipient node 153A would shut down (normal shut down) at time instance t53. According to an aspect of the present invention, recipient nodes are designed to delete the 'message-type' registered with the registration grid at the time of normal (graceful) shutdown. Further, message manager 120 is designed to delete a message identifier sent to (and maintained in) a data distribution channel only upon determining that all recipient nodes in the distribution channel have received the identifier, and have each deleted the corresponding 'message-type' in the registration grid. It is noted that message manager 120 would also stop sending message identifiers to a distribution channel, if it determines (by communicating with registration grid 440) that no recipient nodes are registered for that message type (or if all recipient nodes have de-registered).

Continuing with respect to FIG. 5, the 'message-type' registered with the registration grid at t51 would be maintained in the registration grid, till t53, when recipient node 153A deletes it before shutting down (at t53).

Assuming normal operation, recipient node 153A would receive the message identifier sent by message manager 120 at time t52, and retrieve the corresponding message sometime between t52 and t53, deleting the message-type in registration grid 440 at (or slightly earlier than) t53, when shutting down normally. Message manager node 120 may then (at or later than t53) delete the corresponding message identifier sent earlier and stored in data distribution channel 420, provided all recipient nodes have 'de-registered' with registration grid 440 (i.e., each recipient node in channel 420, namely, 153A and 153B, has deleted its "message type" in registration grid 440).

If a failure in recipient node 153A occurs at t512, the message-type registered at t51 with registration grid 440 continues to be present in registration grid 440. Consequently, the identifier (sent at t52) continues to be persisted (stored) in data distribution channel 420 (for example, in node 153B) since message manager 120 does not delete the identifier. Thus, when/if recipient node 153A resumes normal operation (or an application in it is restored) at t523, recipient node 153A can obtain the identifier still stored in data distribution channel 420, and retrieve the message some time before normal shutdown at t53.

Thus, even if a recipient node or an application or VM executing in a recipient node is non-operational, the recipient node (or application) can at a later point in time (when normal operation is restored) receive the message identifier(s), and thereby retrieve the corresponding message(s).

Figure 6:
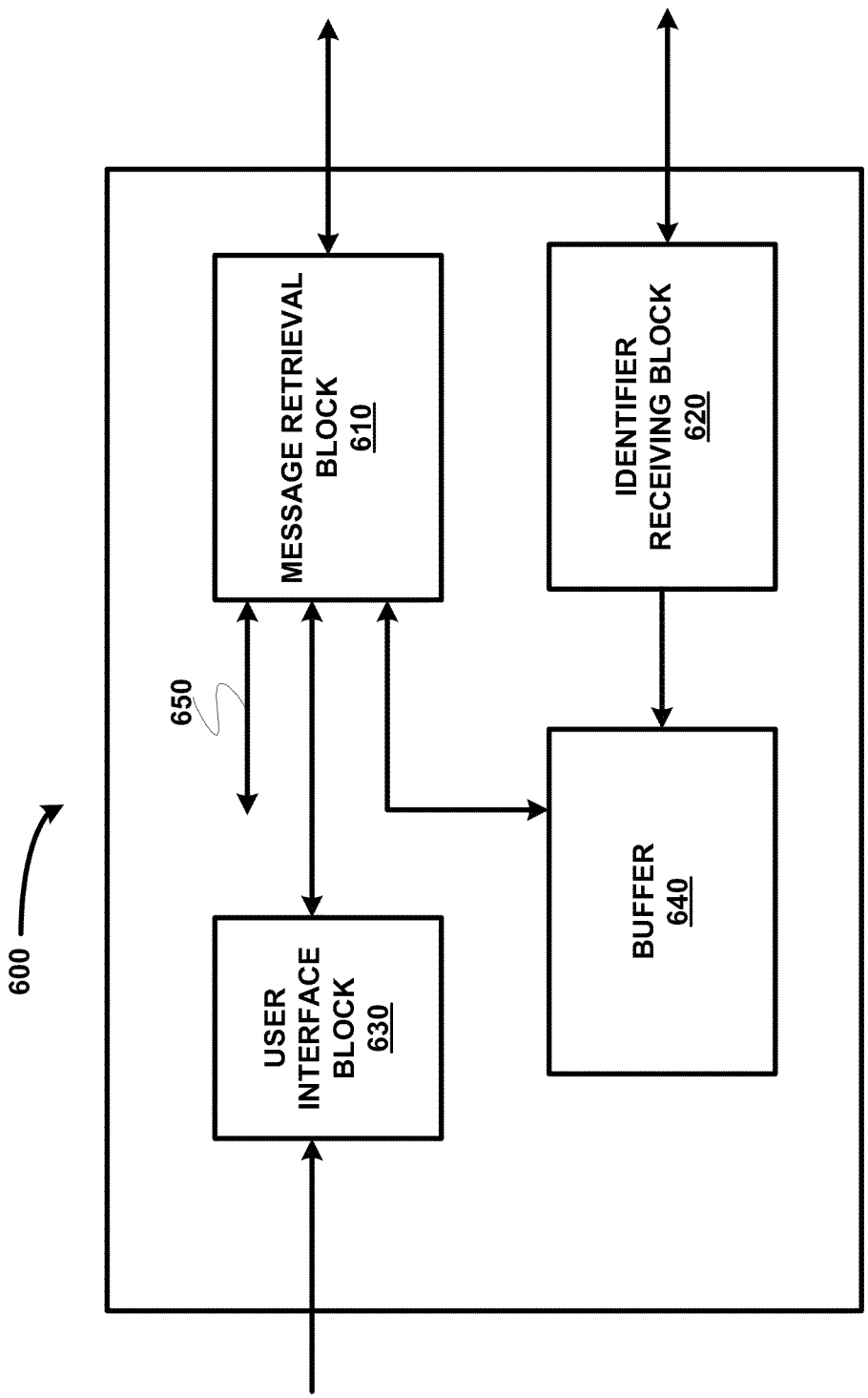
FIG. 6 shows a diagram illustrating an application executing in a recipient node of FIG. 4.

FIG. 6 shows a diagram illustrating an application executing in a recipient node of FIG. 4. Application 600 is shown containing message retrieval block 610, identifier receiving block 620, user interface block 630 and buffer 640. Identifier receiving block 620 receives an identifier of a message, and stores the identifier in buffer 640. Message retrieval block 610 receives a request for data in a message (or an event or alert indicated by a message) either from a user via user interface block 630, or on path 650 from another application portion (not shown) requiring the message. On receipt of the request, message retrieval block 610 checks if any message identifiers are currently stored in buffer 640. Assuming one or more identifiers are stored in buffer 640, message retrieval block 610 retrieves the message(s), and provides the message(s) to the user or application portion that requested for it.

Figure 7:
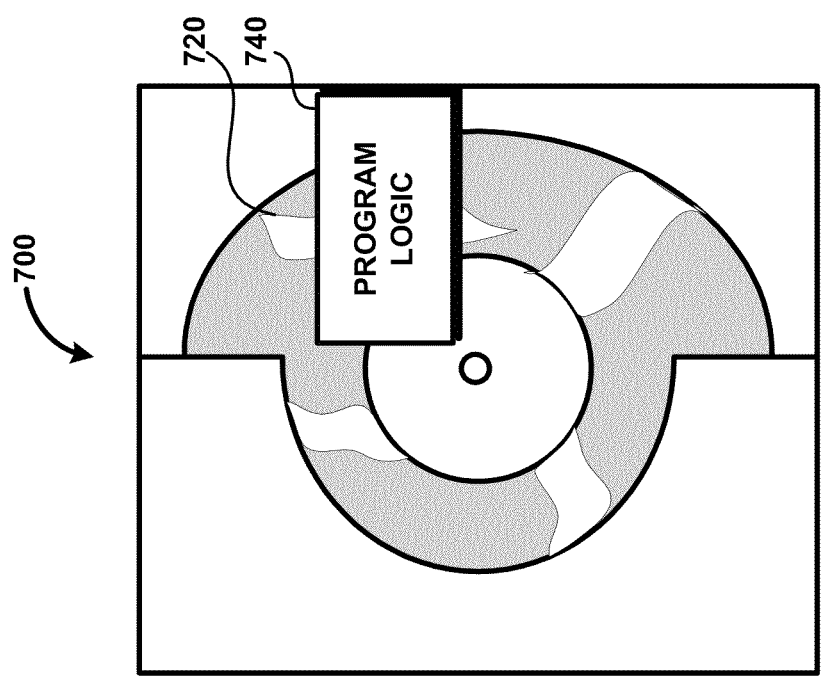
FIG. 7 shows a computer-readable medium encoded for computer-execution of distribution of messages in nodes connected by a grid architecture, the overview of which is shown in FIG. 2 and FIG. 3.

FIG. 7 shows a computer-readable medium encoded for computer-execution of distribution of messages in nodes connected by a grid architecture, the overview of which is shown in FIG. 2 and FIG. 3. Program logic 740 embodied on computer-readable medium 720 is encoded in computer-executable code configured for carrying out the prediction of the policies and other aspects of the present invention described herein and thereby forms a computer program product 700.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of a program code, which when received and loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-implemented method for transferring a message from a source node to selected nodes of a plurality of recipient nodes connected by a grid architecture, the method comprising:
storing in a message grid, a message generated by the source node, the message being uniquely identified by an identifier and a message-type in the message grid; wherein the message grid has a data grid architecture comprising nodes; wherein the message grid makes copies of the message available to nodes of the data grid architecture located proximally to each of the plurality of recipient nodes; wherein each of the plurality of recipient nodes is enabled to have a registration with a registration grid denoting what type of message each node of the plurality of nodes is interested in receiving;
sending the identifier of the message to each of the plurality of recipient nodes registered with the registration grid to receive the type of message associated with the identifier;
retrieving, by each of the plurality of recipient nodes that received the identifier, the message associated with the identifier from the message grid using the identifier;
wherein the retrieving retrieves the message from the node in the message grid located proximally to the recipient node retrieving the message; and
upon retrieving the message from the message by a particular node of the plurality of recipient nodes, deleting in the registration grid the registration of the particular node to receive the type of message.

2. The method of claim 1 wherein each node of the plurality of recipient nodes registers what type of message that each node wants to receive with the registration; and wherein each node of the plurality of recipient nodes deletes the registration upon retrieving the message.

3. The method of claim 2, further comprising:
receiving in a message manager node, prior to the sending, the identifier and the message-type of the message, from the registration grid.

4. The method of claim 3, wherein the message manager node communicates with the registration grid, prior to sending the identifier to the first recipient node, to determine whether or not the message-type of the message is the same as the type of message specified in the registration grid for the first recipient node.

5. The method of claim 4, wherein the message-type of the message is the same as the type of message specified in the registration grid for the first recipient node, and
wherein an application executing in the first recipient node requiring information contained in the message causes the first recipient node to retrieve the message only at a time point at which execution of the application requires the information, wherein the time point occurs later in time than the time at which the identifier of the message is received at the first recipient node.

6. The method of claim 4, wherein the plurality of recipient nodes form a data distribution grid, the identifier of the message being sent to the data distribution grid,
wherein a second recipient node in the plurality of recipient nodes deletes a corresponding message-type specified in the registration grid for the second recipient node prior to shutdown,
wherein the message manager node deletes the identifier from the data distribution grid only on determining that all nodes in the plurality of nodes have de-registered with the registration grid,
wherein the second registration node obtains the identifier from the data distribution grid on being restored from a failure condition, and retrieves the message identified by the identifier.

7. The method of claim 1, wherein failure of a node of the message grid storing the message, the availability of the message to each of the plurality of recipient nodes is maintained; wherein the message manager node deletes the identifier from the data distribution grid upon determining that all nodes in the plurality of nodes have de-registered with the registration grid for that type of message.

8. A non-transitory machine readable medium storing one or more sequences of instructions in nodes in a grid architecture, wherein execution of the one or more sequences of instructions by one or more processors contained in the nodes causes the grid architecture to perform the actions of:
enabling each of a plurality of recipient nodes to have a registration with a registration grid contained in the grid architecture denoting what type of message each node of the plurality of nodes is interested in recieving; wherein the message grid has a data grid architecture comprising nodes; wherein the message grid makes copies of the message available in nodes of the data grid architecture located proximally to each of the plurality of recipient nodes;

specifying to the registration grid a type of message that each recipient node in the plurality of recipient nodes is to receive;

storing in a message grid, the message generated by the source node, the message being uniquely identified by an identifier and a message-type in the message grid;

sending the identifier of the message to each of the plurality of recipient nodes registered with the registration grid to receive the type of message associated with the identifier;

enabling retrieval of a message by recipient nodes in the plurality of recipient nodes to retrieve a message generated by a source node; wherein the retrieving retrieves the message from the node in the message grid located proximally to the recipient node retrieving the message; and retrieving by each of the plurality of recipient nodes that received the identifier, the message associated with the identifier from the message grid using the identifier.

9. The non-transitory machine readable medium of claim 8, further comprising:

receiving in a message manager node, prior to the sending, the identifier and the message-type of the message, from the registration grid.

10. The non-transitory machine readable medium of claim 9, wherein the message manager node communicates with the registration grid, prior to sending the identifier to the first recipient node, to determine whether or not the message-type of the message is the same as the type of message specified in the registration grid for the first recipient node.

11. The non-transitory machine readable medium of claim 10, wherein the message-type of the message is the same as the type of message specified in the registration grid for the first recipient node, wherein an application executing in the first recipient node requiring information contained in the message causes the first recipient node to retrieve the message only at a time point at which execution of the application requires the information, wherein the time point occurs later in time than the time at which the identifier of the message is received at the first recipient node.

12. The non-transitory machine readable medium of claim 10, wherein the plurality of recipient nodes form a data distribution grid, the identifier of the message being sent to the data distribution grid, wherein a second recipient node in the plurality of recipient nodes deletes a corresponding message-type specified in the registration grid for the second recipient node prior to shutdown, wherein the message manager node deletes the identifier from the data distribution grid only on determining that all nodes in the plurality of nodes have de-registered with the registration grid, wherein the second registration node obtains the identifier from the data distribution grid on being restored from a failure condition, and retrieves the message identified by the identifier.

13. The non-transitory machine readable medium of claim 8, wherein upon failure of a node of the message grid storing the message, impact the availability of the message to each of the plurality of recipient nodes is maintained;

wherein the message manager node deletes the identifier from the data distribution grid upon determining that all nodes in the plurality of nodes have de-registered with the registration grid for that type of message.

14. The non-transitory machine readable medium of claim 8, wherein the message identifier of the message is persisted in the message grid for a specified period of time; and after the specified period of time, the message and the message identifier is deleted.

15. The non-transitory machine readable medium of claim 8 wherein each node of the plurality of recipient nodes registers what type of message that each node wants to receive with the registration; and wherein each node of the plurality of recipient nodes deletes the registration upon retrieving the message.

16. A system for transferring messages between nodes connected by a grid architecture, the system comprising:

a plurality of recipient nodes;

a message grid to store messages; wherein the message grid has a data grid architecture comprising nodes;

a source node to generate and store a message in the message grid; wherein the message grid makes copies of the message available to nodes of the data grid architecture located proximally to each of the plurality of recipient nodes;

a registration grid to store a type of message that a recipient node is to receive; and a message manager node, wherein the message manager node receives an identifier and a message-type of a message stored in the registration grid by a source node, and sends the identifier of the message to recipient nodes identified in the registration grid to receive the type of message in the data grid formed by the plurality of recipient nodes, wherein a recipient node in the plurality of recipient nodes identified in the registration grid to receive the type of message retrieves the message from the message grid using the identifier;

wherein the retrieving retrieves the message from the node in the message grid located proximally to the recipient node retrieving the message; and upon retrieving the message from the message by a particular node of the plurality of recipient nodes, deleting in the registration grid the registration of the particular node to receive the type of message.

17. The system of claim 16 wherein each node of the plurality of recipient nodes registers what type of message that each node wants to receive with the registration; and wherein each node of the plurality of recipient nodes deletes the registration upon retrieving the message.

18. The system of claim 17, wherein the message manager node communicates with the registration grid, prior to sending the identifier, to determine whether or not the message-type of the message is the same as the type of message specified in the registration grid for the first recipient node.

19. The system of claim 18, wherein the message-type of the message is the same as the type of message specified in the registration grid for the first recipient node, wherein an application executing in the first recipient node requiring the information contained in the message causes the first recipient node to retrieve the message only at a time point at which execution of the application requires the information, wherein the time point occurs later in time than the time at which the identifier of the message is received at the first recipient node.

20. The system of claim 19, wherein the plurality of recipient nodes form a data distribution grid, the identifier of the message being sent to the data distribution grid, wherein a second recipient node in the plurality of recipient nodes deletes a corresponding message-type specified in the registration grid for the second recipient node prior to shutdown, wherein the message manager node deletes the identifier from the data distribution grid only on determining that all nodes in the plurality of nodes have de-registered with the registration grid, wherein the second recipient node obtains the identifier from the data distribution grid on being restored from a failure condition, and retrieves the message identified by the identifier.

\* \* \* \* \*